United States Patent Office.

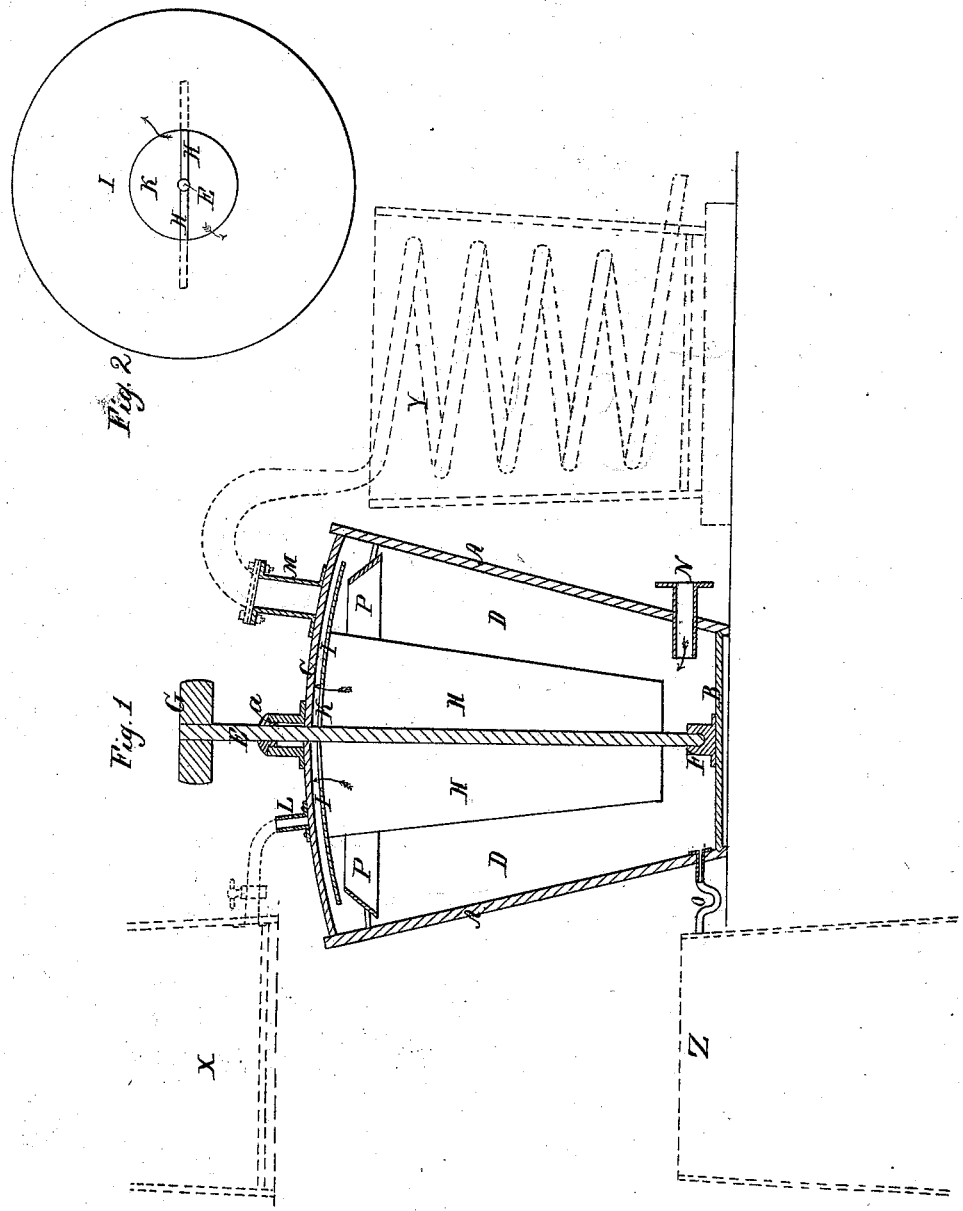

CHARLES LOUIS FLEISCHMANN, OF WASHINGTON, DISTRICT OF COLUMBIA.

Letters Patent No. 89,749, dated May 4, 1869.

IMPROVED DISTILLING-APPARATUS.

The Schedule referred to in these Letters Patent and making part of the same.

*To all whom it may concern:*

Be it known that I, CHARLES LOUIS FLEISCHMANN, of the city of Washington, in the District of Columbia, have invented a new and improved Apparatus for Distilling; and I do hereby declare that the following is a full and exact description thereof, reference being had to the accompanying drawings, and to the letters of reference marked thereon, of which—

Figure 1 represents a sectional side view of the distilling-apparatus.

Figure 2, a top view of the distributer.

The dotted lines illustrate the connections of the improved apparatus with the warming-vats, condenser, &c.

The nature of my invention consists in spreading fermented saccharine liquid in very thin strata, and keeping it in agitation whilst it is exposed to the influence of a proper and uniform degree of heat, whereby the evaporation of the alcohol is accelerated, and the admixture of other volatiles having a higher degree of boiling-point, greatly diminished.

To enable others skilled in the art to make and use my invention, I will proceed to describe its construction and operation.

The apparatus consists of a conical vessel, A, of metal or wood, lined with thin sheets of suitable metal.

The smaller diameter of vessel A is provided with a bottom, B, and the upper and larger opening is closed tight by means of a cover, C.

The interior surface D of the vessel A may be even, corrugated, or lined with other suitable material.

The cover C has in its centre a stuffing-box, a, through which passes the shaft E.

This shaft rests in a socket, F, fastened to the bottom B. Above the cover the shaft E is provided with a pulley, G, over which passes a band which is connected with a motor.

Within the vessel A, the shaft has two or more wings, H H. Upon the top of the wings, and close under the cover, rests a disk, I, which has in its centre a large opening, K, to allow the alcoholic vapor to pass through.

The pipe L, which passes through the cover, serves to introduce and distribute the liquid to be distilled on the top of the disk I.

The pipe L connects with the vat which contains the liquid, and warmed therein, shown in dotted lines marked X.

The pipe M, in the cover C, carries the alcoholic vapor to the condenser marked Y, shown in dotted lines.

The pipe N, which enters the vessel A above the bottom B, serves for the introduction of the steam.

The V-shaped pipe or tube O, carries the liquid which collects at the bottom of the vessel A, into the vat Z, shown in dotted lines.

The ream P, placed below the disk I, catches the rebounding liquid, and carries it to the side of vessel A.

Operation.

The fermented liquid is drawn off as clear as possible into the vat X, where it it heated. When it has reached the proper temperature, viz, a few degrees below the boiling-point of alcohol, it is introduced in the improved apparatus and distilled.

The shaft E, with the disk and wings, is set in motion by means of the pulley G, and the liquid contained in vat X is let in through pipe L, upon the revolving disk I, which throws the liquid by the centrifugal force on the side D, of the vessel A. The rebounding liquid or spray is caught by the ream P, and carried back to the side of the vessel A, from where it runs gradually down, spreading over the whole inside of the vessel A in a uniform thin stratum, and is kept in continual motion.

The wings H H agitate the steam, and drive it against the side of the vessel A.

The thin film of liquid covering the side of the vessel, is not only favorably exposed to the direct influence of the heating-medium, but the evaporation of the alcohol is also greatly facilitated.

For heating the liquid, I employ steam, which I introduce either directly into the vessel A, or by means of a steam-jacket on the outside of said vessel A.

The alcoholic vapors obtained from the liquid, rise to the top of the vessel A, and are carried through the pipe M into the condenser, shown in dotted lines, producing thus a fine alcoholic liquor, of a uniform quality and character, free from the objectionable properties of such liquors, obtained by means of the common distilling-apparatus generally in use.

The liquid which collects at the bottom of vessel A, is carried off through the V-shaped tube O, in the vat Z, where it is collected for redistillation in the usual manner with the apparatus generally in use.

This apparatus serves also for redistilling whiskey and other alcoholic liquors.

What I claim as my invention, and desire to secure by Letters Patent, is—

The method of distributing the liquid on the side of the vessel by means of a revolving disk, I, the wings H H, for accelerating the evaporation, the ream P, as well as the general arrangement of the pipes, as herein described.

CH. L. FLEISCHMANN.

Witnesses:
W. BURCHARD,
G. SPERBER.